I. REYNOLDS,

Assignor to self and L. D. REYNOLDS.

Book-Binding.

No. 8,039. Reissued Jan. 15, 1878.

Witnesses:
Geo. T. Smallwood Jr.
Pennington Halsted

Inventor:
Ira Reynolds,
By John J. Halsted
Atty.

N. PETERS, PHOTO-LITHOGRAPHER, WASHINGTON, D. C.

UNITED STATES PATENT OFFICE.

IRA REYNOLDS, OF DAYTON, OHIO, ASSIGNOR TO HIMSELF AND LUCIUS D REYNOLDS, OF SAME PLACE.

IMPROVEMENT IN BOOK-BINDING.

Specification forming part of Letters Patent No. 98,191, dated December 21, 1869; Reissue No. 8,039, dated January 15, 1878; application filed December 18, 1877.

*To all whom it may concern:*

Be it known that I, IRA REYNOLDS, of Dayton, in the county of Montgomery, in the State of Ohio, have invented certain Improvements in Book-Binding and in Account-Books; and I do hereby declare that the following, taken in connection with the drawings which accompany and form part of this specification, is a description of my invention sufficient to enable those skilled in the art to practice it.

Some of the improvements are adapted for note or memorandum books generally, and, indeed, for books of any kind where it may be desirable to remove from the cover the body of the book after the latter has served its purpose, and to supply the cover with a new book; and they consist in a special construction of a removable cover, in a special construction of the back of a stitched book, adapting it to be readily applied to, be held by, and removed from, such a cover, and in other particulars hereinafter described.

Other parts of my improvements relate more especially to books suitable for salesmen and book-keepers, and are designed not only to facilitate and economize their labors, but also to serve as a check upon both, and a protection of their employer and his customers.

I have illustrated and shall describe my invention as applied to books appropriate for salesmen in mercantile houses.

Figure 1:
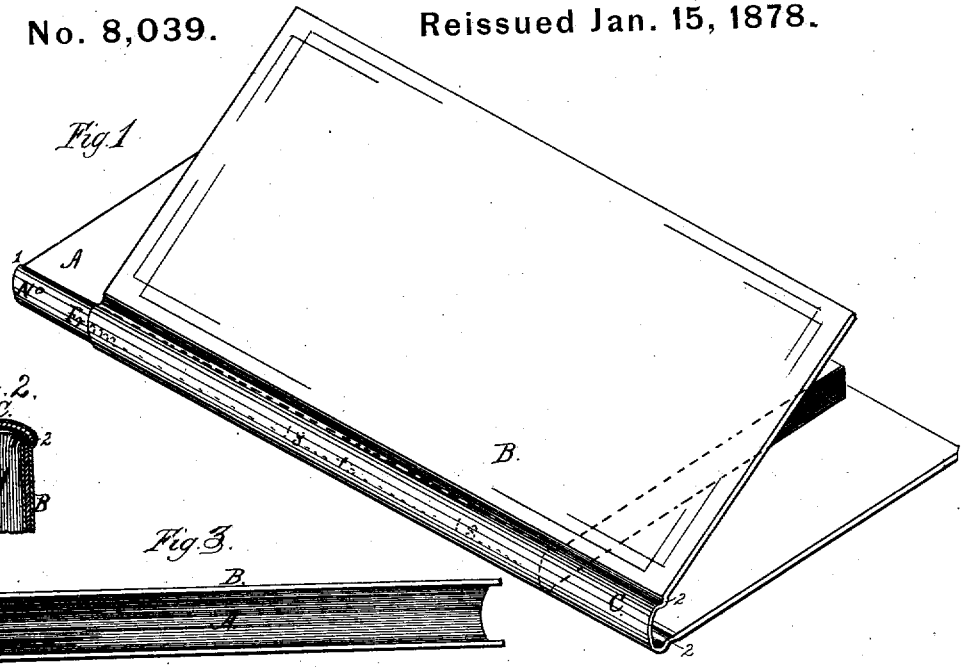
Figure 2:
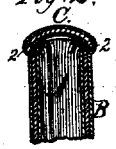
Figure 3:
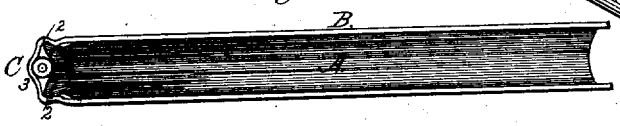
Figure 4:
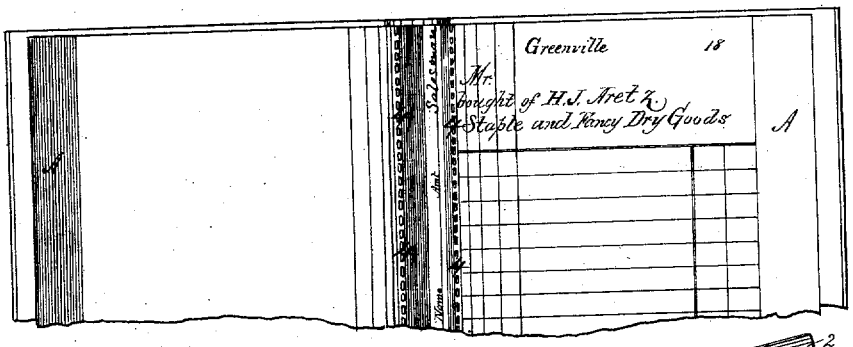
Figure 5:
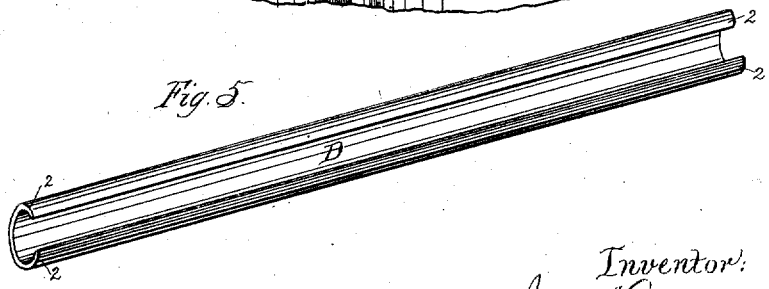

Figure 1 represents a book partially slipped from its cover, and showing my invention in part. Fig. 2 is an end view, showing the novel construction of the back of the book and its cover. Fig. 3 shows a modification in the construction of these backs. Fig. 4 shows the inside of one of my improved books, and Fig. 5 the metal back which I use in the back of the cover.

A indicates the book proper; B, its cover; C, its back; and D, the metallic piece, which serves to form the body of the back prior to its being covered with its covering of leather or other material, which connects it with the wings or flaps of the cover. This metallic piece, it will be seen, is so bent that its two edges turn somewhat inward, so that it may embrace and clasp the back of the book when inserted therein. The back of the book itself is also so formed by compression in an appropriate press or former as to have ridges 1 running lengthwise, and which are designed to be grasped by the edges 2 of the metal back.

As seen in the drawing, the book may thus be readily slipped into its place in the back of the cover, and securely held, while the flexibility of the leather or other covering of the back allows the book to be freely opened and shut with the usual facility. It may also be readily removed, and another blank or unwritten book be substituted for it, the same cover answering for scores of books.

The back of the book itself, as seen in this figure, I print somewhat as shown, in order to give a serial number to the book, and the back may also, if preferred, be printed in blank, for the reception of dates at which the entries therein begin and at which they end.

The salesman or merchant keeping possession of and filing away this little book when filled, each entry on his journal-book having a reference to such book by its number, there is no necessity, in such case, of his keeping a day-book, nor of entering anywhere else the items of each bill, for, not only does the little book give all the items whenever wanted, but it is sure, also, to contain a fac-simile, as to the items, of the bill rendered to the purchaser, and which shall have been torn from the book at the time of the purchase.

Instead of forming the backs of the cover and of the book as shown in Figs. 1 and 2, I find that, without any more expense, but by simply giving them a different shape by means of a different former, so as to produce a central longitudinal groove in each, as shown at 3 3 in Fig. 3, a chamber may be formed to receive a pencil.

This mode of forming the chamber not only dispenses with the cost and labor of appending leather loops for the pencil, as customary upon memorandum-books, but it actually strengthens still more the metal back.

Instead of sliding the book into the cover, it may be sprung in edgewise just as readily, if the rigid back of the cover be not made too rigid, and has a little yielding or springing quality.

In the book shown open in Fig. 4, both the leaves on which is the bill-heading and also the blank leaves (the two alternating with each other throughout the book) are perforated, as shown at 4 4, so that the leaves may be readily torn from the book after the bill has been made out, the bill being delivered to the customer, the letter-press duplicate thereof delivered to the book-keeper, from which to make his entries, and the marginal stub of the bill remaining permanently in the book, each serving, at any future period, as a check against fraud on the part of any of the parties concerned.

In the book shown in Fig. 1 there is no marginal stub, as none is needed, because the full duplicate of the items of the original bill as delivered is retained in the book itself, and those leaves only are perforated on which the original bill is made out, because it alone needs to be torn out, the copy remaining.

I claim—

1. A removable book-cover the back of which is made of metal, and shaped to span and grasp the back of a book, substantially as shown and described.

2. A removable, unbound, stitched book, provided with compressed and hardened longitudinal ribs 1 upon its back, adapting it to be slipped into or out of, and firmly held by, a removable cover, the back of which is shaped to span and grasp the same, substantially as shown and described.

3. A book-cover the metal back of which forms an integral part thereof, and supports the two lids of the cover, and is shaped to span and grasp the back of a removable book, substantially as herein set forth.

4. A cover and book, substantially such as specified, each having a longitudinal groove or indentation, as described, and shown in Fig. 3, so that the two, when united, form a tube or chamber to receive a pencil or similar article.

In testimony that I claim the foregoing I have hereunto set my hand this 18th day of December, 1877.

IRA REYNOLDS.

Witnesses:

JAS. H. GRIDLEY,

PENNINGTON HALSTED.